NONDESTRUCTIVELY INTERROGATED MAGNETIC MEMORY
Filed June 21, 1963
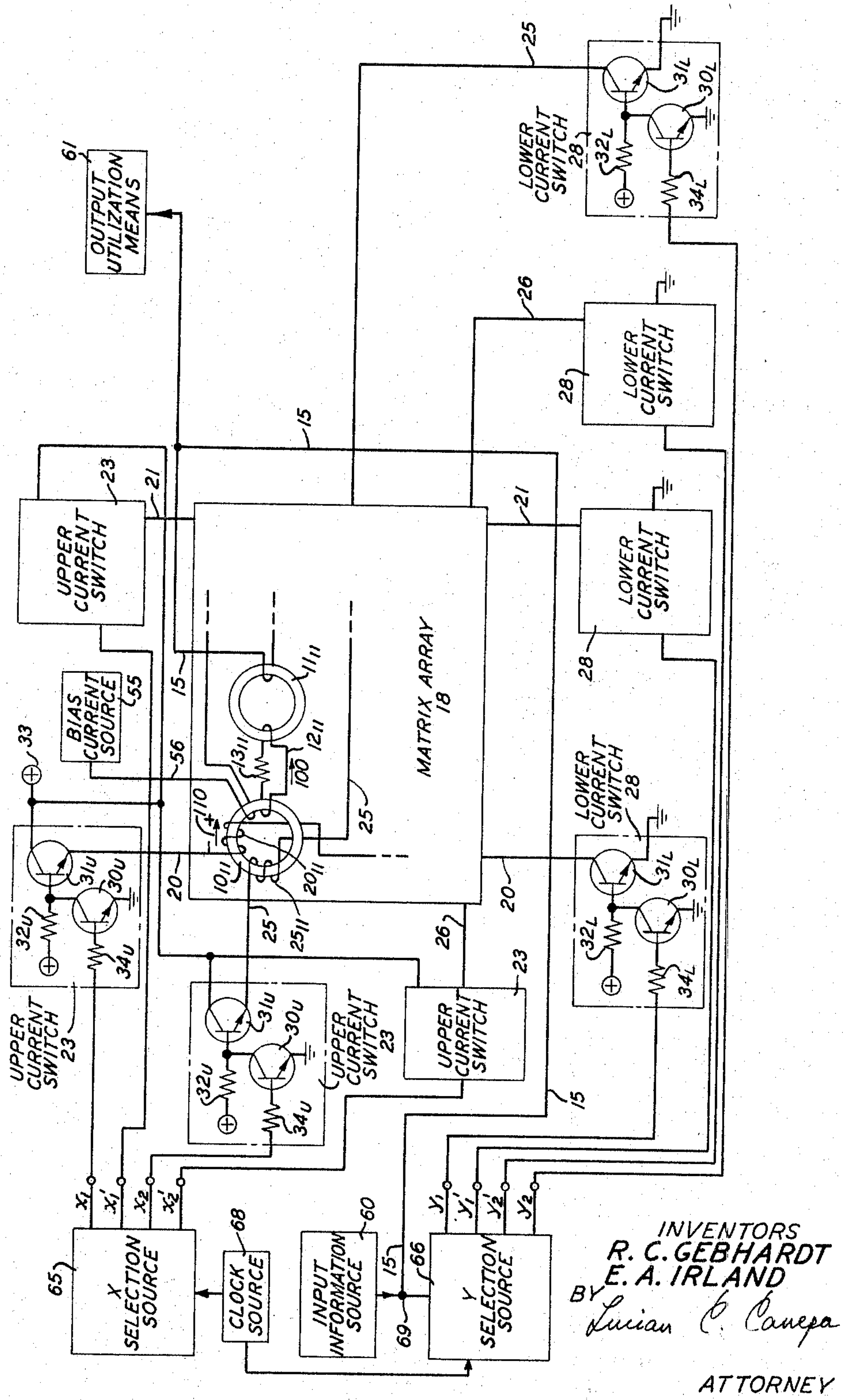
INVENTORS
R. C. GEBHARDT
E. A. IRLAND
BY Lucian C. Canepa
ATTORNEY 3,323,114
Patented May 30, 1967

3,323,114

NONDESTRUCTIVELY INTERROGATED MAGNETIC MEMORY

Robert C. Gebhardt, Parsippany, and Edwin A. Irland, Middletown, N.J., assignors to Bell Telephone Laboratories, Incorporated, New York, N.Y., a corporation of New York Filed June 21, 1963, Ser. No. 289,541
16 Claims. (Cl. 340—174)

This invention relates to information storage and, more specifically, to a magnetic memory arrangement which may advantageously be nondestructively interrogated.

Magnetic circuits which supply a selected one of a plurality of information digits to a common output terminal are well known. Perhaps the most common and extensively employed of such circuits is the random access storage memory. Typically, digital information is supplied to a store during a write-in process and is stored at discrete address locations in magnetic binary memory elements. Each of the binary characters may be represented, for example, by one of the two distinct maximum remanent hysteresis polarities, and one binary bit may be stored for each element employed. When a stored information digit is desired, the corresponding address is interrogated by driving the memory element included at the address to one of its saturation conditions. In response thereto, an output signal, representative of the information digit stored thereat, is supplied to the output terminal.

However, as each of the elements included in such a storage memory is driven to the same magnetic condition during the interrogation process, information is no longer stored therein, and a new write-in cycle is required after each interrogation. If it is desired to nondestructively interrogate such a memory, a relatively large number of additional circuit elements must be added to the storage arrangement. This circuitry includes, inter alia, logic elements to select the previously interrogated address, and a switching source to selectively drive the ferromagnetic element contained thereat to its original maximum remanent state.

It is therefore an object of the present invention to provide an improved information storage arrangement.

More specifically, it is an object of the present invention to provide an information store which may be nondestructively interrogated.

It is another object of the present invention to provide a magnetic information storage arrangement which is highly reliable and which may advantageously be inexpensively and easily constructed.

These and other objects of the present invention are realized in a specific illustrative, nondestructively interrogated memory arrangement which includes a matrix array of biased, coincident current-selected magnetic core access switches. A different one of a plurality of square loop, ferromagnetic storage cores is coupled to each access core by an interrogation and reset winding which includes a series-connected impedance, and an output winding is coupled to each storage core. Binary information is manifested by each storage core residing in a selected one of the two possible maximum remanent conditions.

Each address included in the memory is interrogated by switching the magnetic condition in the corresponding core access switch, thereby supplying a magnetizing force to the associated storage core. A voltage may or may not be induced in the output winding depending upon the initial polarity of flux contained in the storage core. Circuit connections are provided such that if the output winding is not energized, a relatively small voltage is impressed across each selection winding coupled to the access core, which is under these conditions reset relatively slowly, and does not switch the storage core. If a signal is induced in the output winding, however, no voltage is impressed on the selection windings, and the access core is reset at a relatively rapid rate, thereby resetting the storage core to its original magnetic condition.

It is thus a feature of the present invention that a magnetic memory circuit include a ferromagnetic, square loop core, driving circuitry for switching the remanent polarity of flux stored in the core, and circuitry for selectively resetting the core relatively slowly by impressing a relatively small voltage across a winding coupled thereto, or for resetting the core at a relatively rapid rate of speed by impressing no voltage across the winding.

It is another feature of the present invention that a nondestructivly interrogated storage memory comprise first and second square loop, ferromagnetic cores mutually coupled by a winding which includes a series impedance, driving circuitry for switching the first core thereby supplying a switching magnetizing force to the second core, and circuitry for selectively resetting the first core at a relatively rapid or a relatively slow rate of speed.

A complete understanding of the present invention and of the above and other features, variations and advantages thereof may be gained from a consideration of the following detailed description of an illustrative embodiment thereof presented hereinbelow in conjunction with the single figure of the accompanying drawing which is a diagram of a specific, illustrative magnetic core information store which embodies the principles of the present invention.

Refering now to the drawing, there is shown a two-by-two information storage matrix 18 employing two vertical selection windings 20 and 21, and two horizontal selection windings 25 and 26. Each of the selection windings is connected by an upper current switch 23 to a common voltage source 33, and further connected to a common ground terminal by a lower current switch 28. Each upper current switch 23 includes a first transistor-resistor-logic stage (TRL stage) which comprises a transistor $30_U$ having a grounded emitter terminal, and a collector terminal which is connected to a positive voltage source by a resistor $32_U$. A second transistor $31_U$ is included in each of the upper current switches. The base, collector and emitter terminals of the transistor $31_U$ are respectively connected to the collector of the TRL transistor $30_U$, the positive source 33, and an associated selection winding.

The base terminal of each TRL transistor $30_U$ included in a switch 23 is connected by a resistor $34_U$ to a different output terminal of an X selection source 65. The resistors $34_U$ included in the upper current switches 23 associated with the windings 20 and 21 are respectively connected to the $x_1$ and $x_1'$ output terminals of the X selection source 65, while the resistors $34_U$ included in the switches 23 connected to the windings 25 and 26 are connected to the $x_2$ and $x_2'$ output terminals, respectively.

Each of the lower current switches 28 is essentially identical to each of the upper current switches 23. In a similar manner as was described above for the upper switches 23, the resistors $34_L$ included in the lower switches 28 associated with the windings 20 and 21 are respectively connected to the $y_1$ and $y_1'$ output terminals of a Y selection source 66 while the resistors $34_L$ included in the switches 28 connected to the windings 25 and 26 are respectively connected to the $y_2$ and $y_2'$ output terminals. It is noted that the elements included in each upper current switch 23 are identified with the subscript U, while the corresponding elements included in each lower current switch have the subscript L associated therewith.

The sources 65 and 66 normally supply a relatively high, direct-current potential to each of the output terminals associated therewith. Selection is accomplished by the sources 65 and 66 which coincidentally supply a relatively low voltage pulse to two of the output terminals included therein, responsive to timing signals supplied thereto by a clock source 68. The relative duration of the pulses supplied by the X and Y selection sources 65 and 66 will be discussed hereinafter.

The two-by-two storage matrix array 18 shown in the drawing includes four information storage addresses. Each address includes an access core 10 coupled by a winding 12 to a storage core 11, with a resistor 13 being serially connected to the winding 12. It is noted that only the elements 10 through 13 included in the first row and first column of the information storage matrix 18 are shown in the drawing. The remaining three storage addresses are not shown in detail so as to enhance the clarity of the drawing, but it is to be understood that these locations are included within the matrix array 18. Also, the elements 10, 11, 12 and 13 illustrated in the drawing are further identified by the subscript 11 to denote their presence in the first row and first column of the over-all matrix arrangement.

Each access core 10 has coupled thereto one of the vertical selection windings 20 or 21, and one of the horizontal selection windings 25 or 26 to supply a magnetizing force thereto in a clockwise direction. Also, a biasing winding 56, serially connected to a bias current source 55, is linked to each access core 10 to supply thereto a continuous, counter-clockwise, biasing and resetting magnetizing force. The currents supplied to the selection windings are arranged such that two coincidentally energized selection windings coupled to any core 10 generate a sufficient magnetizing force to switch the access core 10 from the counter-clockwise, biased orientation to a clockwise direction. If only one winding coupled to an access core 10 is energized, however, the resulting magneto-motive force is insufficient in magnitude to switch the access core.

In addition to the above-described windings, an output winding 15 is coupled to each of the information storage cores 11. One end of the winding 15 is connected to an output utilization means 61 and further connected to a control terminal 69 associated with the Y selection source 66, while the other end (not shown) is connected to ground.

The X source 65 selectively supplies relatively low-valued output voltage pulses of a fixed time duration to one of the output terminals $x_1$ or $x_1'$, and also to one of the terminals $x_2$ and $x_2'$. The coincidentally initiated pulses supplied by the Y selection source 66 are normally of a longer time duration than the corersponding pulses generated by the source 65. However, when an output energization signal is transmitted to the source 66 by the output winding 15, the relatively low voltage pulses generated by the Y selection source 66 terminate at the same time as the corresponding pulses emitted by the X selection source 65. The X and Y sources 65 and 66 may comprise, for example, monostable multivibrator circuits with the timing of the arrangements included in the source 66 being a function of the potential appearing on the output winding 15.

Briefly describing the operation of a typical current switch 23 or 28, a relatively high direct-current voltage is normally supplied thereto by the appropriate selection source 65 or 66, through the resistor 34, to the base terminal of the TRL transistor 30. The transistor 30 is saturated by the applied voltage, effectively impressing ground potential at the base of the associated transistor 31 which is hence quiescently rendered nonconductive. Conversely, a relatively low potential supplied by the corresponding selection source 65 or 66 to the resistor 34 will render the TRL transistor 30 nonconductive, hence applying a positive potential to the base terminal of the associated transistor 31, which is saturated in response thereto. The transistor 31 is under this latter condition rendered highly conductive, and effectively presents a zero impedance conduction path to the associated selection winding.

To illustrate a typical cycle of opeartion for the information storage arrangement depicted in the drawing, assume that the storage core $11_{11}$ included in the first row and first column of the matrix is initially set to a clockwise maximum remanent condition, which will be termed the binary 0 storage polarity. Each of the access cores 10 is, of course, in a counter-clockwise, saturated condition under the action of the energized bias winding 56. Assume further that it is desired to interrogate this storage address. To interrogate the core $11_{11}$, the X selection source 65 and the Y selection source 66 coincidentally supply relatively low potentials to the $x_1$ and $x_2$, and $y_1$ and $y_2$, output terminals, respectively, included therein. In response thereto, the transistors 30 and 31, included in the current switches 23 and 28 associated with the windings 20 and 25, are respectively in a nonconductive, and a saturated condition, as described above. Hence, a complete conduction path from the common voltage source 33 to ground potential through each of the selection windings 20 and 25 is established.

The currents which flow through the selection windings 20 and 25 each supply a clockwise magnetizing force to the access core $10_{11}$. The net applied field supplied by the windings 20 and 25 exceeds the counter-clockwise biasing magnetomotive force supplied to the core $10_{11}$ by the winding 56. In fact, the net applied field exceeds the biasing field by an amount sufficient to exceed the switching threshold of the core $10_{11}$. As a result, the access core $10_{11}$ reverses its magnetic condition from a counter-clockwise to a clockwise magnetic state, thereby inducing a current in the interrogation and reset winding $12_{11}$ in the direction of the vector 100 shown alongside the winding $12_{11}$ in the drawing. The energized winding $12_{11}$ supplies a clockwise magnetizing force to the storage core $11_{11}$ but, as this core was assumed to already be in a clockwise maximum remanent state, only a small, negligible shuttle flux is switched therein. Hence, only a negligible potential is induced in the output winding 15 coupled to the core $11_{11}$ and supplied by the winding 15 to the output utilization means 61 and also to the source 66.

Upon the termination of the selection pulses supplied by the X selection source 65, relatively high potentials are once again supplied to the $x_1$ and $x_2$ output terminals included therein. However, as the Y selection source 66 has not had applied thereto an induced voltage in the output winding 15, the relatively low voltages at the output terminals $y_1$ and $y_2$ persist for a fixed period after the $x_1$ and $x_2$ output terminals of the source 65 have been returned to the relatively high state. The relatively high potentials supplied to the upper current switches 23 connected to the selection windings 20 and 25 will render the TRL transistors $30_U$ included therein conductive, thereby impressing ground potential at the base terminals of the associated transistors $31_U$, rendering these transistors nonconductive. However, with respect to the lower current switches 28 connected to the windings 20 and 25, the output terminals $y_1$ and $y_2$ are still supplying thereto relatively low input voltages, and hence the transistors $30_L$ and $31_L$ included therein remain in a nonconductive and conductive condition, respectively.

As the transistor $31_U$ included in the upper current switch 23 connected to the winding 20 is effectively open circuited at this time, no current flows in this winding and the core $10_{11}$ initiates a switching action from the clockwise to the counter-clockwise direction under the action of the energized biasing winding 56. However, as the rate of switching in the core $10_{11}$ becomes rapid enough to induce a few volts in the winding $20_{11}$, in the polarity indicated by the plus and minus signs associated with the vector 110 shown in the drawing, the potential across the winding $20_{11}$ coupled to the core $10_{11}$ is constrained to be of a relatively low, fixed magnitude. This stems from the fact that the voltage on the lower end of the winding 20 is effectively ground potential, as the transistor $31_L$ connected thereto is in a saturated condition.

Also, the voltage at the base of the transistor $21_U$ connected to the winding $20_{11}$ is also effectively ground potention as the transistor $30_U$ associated therewith is also saturated. Hence, as the switching in the core $10_{11}$ induces a voltage in the winding $20_{11}$ in the polarity indicated alongside the vector 110, the base-emitter junction of the upper current switch transistor $31_U$ acts as a forward-biased diode, and is effectively a constant voltage source of the magnitude of a few tenths of a volt. Adding the above-described, serially contiguous potentials, it is apparent that a small, fixed, direct-current potential is impressed across the winding $20_{11}$. In addition, a similar voltage is supplied to the winding $25_{11}$ by circuit operation which is the direct analogy of that discussed above relating to the winding $20_{11}$. Hence, flux included in the core $10_{11}$ is constrained to switch at a relatively slow rate of speed so as not to induce more than these small voltages in the windings 20 and 25. For example, should the core attempt under these conditions to switch flux at a faster speed in response to the relatively large magnetizing force supplied by the winding 56, a large current would be induced in the windings 20 and 25 in a direction to cancel the magnetomotive force supplied by the energized winding 56, hence limiting the rate at which the access core $10_{11}$ is reset.

As the core 10 is under these conditions reset at a relatively slow rate of speed, a relatively low potential is induced in the interrogation winding $12_{11}$ in a direction opposite to the vector 100. The current in the winding $12_{11}$, equal in magnitude to the quotient of the induced voltage divided by the value of the resistor 13, is made insufficient to exceed the coercive force of the core $11_{11}$ under the above conditions. Hence, the storage core $11_{11}$ is not switched during the reset operation from its initial clockwise, or binary 0 condition assumed above. Thus, it may be observed that the storage matrix is again in a condition to have interrogated any of the storage addresses included therein, and that the original information is still stored in the core $11_{11}$, which has thus been nondestructively interrogated.

Assume now that the core $11_{11}$ was initially set to a counter-clockwise maximum remanent condition, thereby storing a binary 1, and that it is desired to interrogate this storage address. As described above, the sources 65 and 66 would supply relatively low potentials to the $x_1$ and $x_2$, and $y_1$ and $y_2$ output terminals included therein, thereby saturating the transistors 31 associated with each of the selection conductors 20 and 25 and establishing currents in these conductors. In response to the energized windings 20 and 25, the access core $10_{11}$ again switches from its biased, counter-clockwise state to the clockwise direction, thereby inducing a current in the winding $12_{11}$ in the direction of the vector 100, which again supplies a magnetizing force in the clockwise direction to the storage core $11_{11}$. In this case the storage core $11_{11}$ has a counter-clockwise, binary 1 flux stored therein, and the magnetic condition of the core $11_{11}$ reverses from the counter-clockwise to the clockwise polarity under the action of the energized winding $12_{11}$. As the core $11_{11}$ switches its magnetic state, it induces a relatively large voltage pulse in the output winding 15, which is supplied to the output utilization means 61 and to the Y selection source 66.

Under the above conditions, the Y selection source 66 detects the presence of the pulse induced in the output winding 15 and, upon the termination of the selection pulses supplied by the X source 65, the sources 65 and 66 coincidentally supply relatively high potentials to the $x_1$ and $x_2$, and $y_1$ and $y_2$ output terminals included therein. As discussed hereinabove, each of the upper current switches 23 and also the lower current switches 28 connected to selection windings 20 and 25 respond to the relatively high potentials appearing at the $x_1$, $x_2$, $y_1$ and $y_2$ source output terminals and effectively become open circuits, hence leaving each end of the selection windings 20 and 25 at a floating potential.

At this time, the access core $10_{11}$ is again reset by the magnetizing force supplied by the energized bias and reset conductor 56. In this case, however, the windings 20 and 25 are each at a floating potential, and the rate of reset of the access core $10_{11}$ is limited only by the magnitude of the energization supplied to the reset winding 56. Hence, the access core $10_{11}$ is reset at a relatively rapid rate of speed, and a relatively large current is induced in the winding $12_{11}$ in a direction opposite to the vector 100. This energization of the winding $12_{11}$ supplies a relatively large magnetizing force to the storage core 11 which switches from its former, clockwise state to its initial, counter-clockwise magnetic condition. Hence, the matrix arrangement is again in a condition for interrogation of a new storage address, and the assumed binary 1, counter-clockwise storage condition for the storage core 11 has been re-established. Thus, it has been shown that a storage core 11 may be nondestructively interrogated, independent of the value of the stored binary digit.

It is apparent that information may be initially introduced into the matrix array by disconnecting the otuput winding 15 from the Y selection source 66, and substituting therefor energization signals supplied by an input information source 60. By sequentially selecting the access core 10 associated with each storage address, a pulse supplied by the input source 60 will result in a binary 1 being read into the selected storage core 11, while a binary 0 is stored in the core 11 included in a selected storage address by the absence of an energization signal supplied by the input source 60.

Summarizing, an illustrative nondestructively interrogated magnetic memory made in accordance with the principles of the present invention includes a matrix array of biased, coincident current selected magnetic core access switches. A different one of a plurality of square loop, ferromagnetic storage cores is coupled to each access core by an interrogation and reset winding which includes a series-connected impedance, and an output winding is coupled to each storage core. Binary information is manifested by each storage core residing in a selected one of the two possible maximum remanent conditions.

Each address included in the memory is interrogated by switching the magnetic condition in the corresponding core access switch, thereby supplying a magnetizing force to the associated storage core. A voltage may or may not be induced in the output winding depending upon the initial polarity of flux contained in the storage core. If the output winding is not energized, a constant voltage is impressed across each selection winding coupled to the access core, which is under these conditions reset relatively slowly and does not switch the storage core. If a signal is induced in the output winding, however, no voltage is impressed on the selection windings, and the access core is reset at a relatively rapid rate, thereby resetting the storage core to its original magnetic condition.

It is to be understood that the above-described arrangement is only illustrative of the application of the principles of the present invention. Numerous other arrangements may be devised by those skilled in the art without departing from the spirit and scope of this invention. For example, a two-by-two storage matrix was chosen solely for the purpose of clarity and a storage memory of any capacity might well have been employed. Such increased capacity would, of course, require additional upper and lower current switches along with additional selection windings. Also, in such an arrangement a plurality of parallel, logic generating resistors would be connected to the base of each of the TRL transistors 30 included in the upper and lower current switches to energize the desired selection conductors.

What is claimed is:

1. In combination, first and second square loop ferromagnetic cores, and impedance, a first winding coupled to each of said cores and serially including said impedance, means for switching said first core thereby supplying a magnetizing force to said second core, and resetting means responsive to said first and second cores switching state for resetting said first core at a relatively rapid rate and responsive to said first core switching and said second core not switching for resetting said first core at a relatively slow rate of speed.

2. A combination as in claim 1, wherein said means for switching said first core comprises a second winding coupled to said first core, and said resetting means includes means for selectively impressing a relatively small, direct-current potential across said second winding.

3. A combination as in claim 2, wherein said potential impressing means comprises an upper and a lower current switch respectively connected to the ends of said second winding, each of said switches comprising a first, normally-on transistor and a second, normally-off transistor each including base, emitter and collector terminals, said base terminal of said normally-off transistor being connected to said collector terminal of said normally-on transistor.

4. A combination as in claim 3, wherein said second winding connects said emitter terminal of said normally-off transistor included in said upper current switch with said collector terminal included in said normally-off transistor included in said lower current switch.

5. A combination as in claim 4, further comprising an input voltage pulse source connected to said base terminal of said first, normally-on transistor included in a selected one of said current switches, and an output winding coupled to said second core and connected to said input pulse source.

6. A combination as in claim 5, further comprising output utilization means connected to said output winding, and an input information source connected to said input pulse source.

7. A combination as in claim 4, further comprising an output winding coupled to said second core, and means responsive to an energization occurring in said output winding for selectively rendering nonconductive said second, normally-off transistor included in said lower current switch.

8. In combination, a plurality of square loop ferromagnetic access cores, a like polarity of square loop ferromagnetic storage cores, a like polarity of interrogation windings each coupling a different one of said access cores to a different one of said storage cores, means for selectively switching each of said access cores thereby supplying a magnetizing force to said associated storage core, and means responsive to said selected storage core switching its magnetic state for resetting said associated access core at a relatively rapid rate of speed and responsive to said storage core not switching its magnetic condition for resetting said associated access core at a relatively slow rate of speed.

9. A combination as in claim 8, further comprising an energy source and a constant potential terminal, wherein said switching means comprises a plurality of sets of selection windings, a different set of said selection windings being coupled to each of said access cores, and a plurality of upper and lower current switches for connecting each of said selection windings to said energy source and to said constant potential terminal.

10. A combination as in claim 9, wherein each of said upper and lower current switches comprises a first, normally-on transistor and a second, normally-off transistor each including base, emitter and collector terminals, said base terminal of said normally-off transistor being connected to said collector terminal of said normally-on transistor.

11. A combination as in claim 10, further comprising an output utilization means, and an output winding coupled to each of siad plurality of storage cores and connected to said output utilization means.

12. A combination as in claim 10, further comprising means responsive to one of said access cores and the associated one of said storage cores both reversing their magnetic condition for rendering each of said second, normally-off transistors included in the corresponding lower current switches nonconductive and responsive to said access core switching its magnetic condition and said associated storage core failing to switch its magnetic state for rendering conductive said corresponding second, normally-off transistors.

13. A combination as in claim 9, further comprising a plurality of resistors in one-to-one correspondence with said interrogation windings, each of said resistors being serially connected to a different interrogation winding.

14. In combination, access and storage square loop ferromagnetic cores, an impedance, a winding coupled to each of said cores and serially including said impedance, means including a switching winding coupled only to said access core for switching said access core, and means responsive to said access core switching its magnetic state and said storage core not switching its magnetic condition for impressing a relatively low potential across said switching winding.

15. In combination, first through fourth transistors each including a base, emitter and collector terminal, a first square loop ferromagnetic element, a first winding coupled to said ferromagnetic element, said collector terminals of said first and second transistors being connected to said base terminals of said third and fourth transistors, respectively, said winding connecting said third transistor emitter terminal and said fourth transistor collector terminal, a voltage source connected to said third transistor collector terminal, a common ground terminal connected to said fourth transistor emitter terminal, a second square loop ferromagnetic element, an impedance, and a second winding coupled to said first and second ferromagnetic elements and serially connected to said impedance.

16. A combination as in claim 15 further comprising two pulse sources for selectively supplying relatively high or low monopolar voltages to said base terminals included in said first and second transistors.

References Cited

UNITED STATES PATENTS

| | | | |
|---|---|---|---|
| 2,735,021 | 2/1956 | Nilssen | 307—88 |
| 3,054,905 | 9/1962 | Lee | 307—88 |

BERNARD KONICK, *Primary Examiner.*

S. M. URYNOWICZ, *Assistant Examiner.*